United States Patent
Ponnuru et al.

(10) Patent No.: US 11,928,191 B2
(45) Date of Patent: Mar. 12, 2024

(54) SYSTEM AND METHOD FOR AUTHORIZATION SCOPE EXTENSION FOR SECURITY PROTOCOL AND DATA MODEL CAPABLE DEVICES

(71) Applicant: DELL PRODUCTS, LP, Round Rock, TX (US)

(72) Inventors: Viswanath Ponnuru, Bangalore (IN); Rama Rao Bisa, Bangalore (IN); Chandrashekar Nelogal, Round Rock, TX (US); Chandrasekhar Mugunda, Austin, TX (US); Lee E. Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 571 days.

(21) Appl. No.: 17/145,479

(22) Filed: Jan. 11, 2021

(65) Prior Publication Data

US 2022/0222325 A1    Jul. 14, 2022

(51) Int. Cl.
| | | |
|---|---|---|
| *G06F 21/31* | (2013.01) | |
| *G06F 8/65* | (2018.01) | |
| *G06F 13/42* | (2006.01) | |
| *G06F 21/57* | (2013.01) | |
| *G06F 21/60* | (2013.01) | |

(52) U.S. Cl.
CPC ............... *G06F 21/31* (2013.01); *G06F 8/65* (2013.01); *G06F 13/4221* (2013.01); *G06F 13/4282* (2013.01); *G06F 21/57* (2013.01); *G06F 21/604* (2013.01); *G06F 2213/0016* (2013.01); *G06F 2213/0026* (2013.01)

(58) Field of Classification Search
CPC .. G06F 13/4221; G06F 13/4282; G06F 21/31; G06F 21/57; G06F 21/604; G06F 2213/0016; G06F 2213/0026; G06F 8/65
See application file for complete search history.

(56) References Cited

U.S. PATENT DOCUMENTS

| | | | |
|---|---|---|---|
| 9,467,441 B2 | 10/2016 | Ballard | |
| 10,318,550 B2 | 6/2019 | Narayanan et al. | |
| 2011/0282962 A1* | 11/2011 | Suzuki | ................... H04L 67/025 709/208 |
| 2014/0195704 A1* | 7/2014 | Bhatia | ................. G06F 11/3055 710/105 |
| 2016/0261690 A1 | 9/2016 | Ford | |
| 2016/0380830 A1* | 12/2016 | Cheng | ................... H04L 67/025 709/220 |
| 2019/0320091 A1* | 10/2019 | Bush | ...................... G03G 15/50 |
| 2020/0133355 A1 | 4/2020 | Bassman et al. | |
| 2020/0233983 A1 | 7/2020 | Robison et al. | |

OTHER PUBLICATIONS

Security Protocol and Data Model (SPDM) Specification, DSP0274 version 0.99.0a, (2019) (Year: 2019).*

* cited by examiner

*Primary Examiner* — Theodore C Parsons
(74) *Attorney, Agent, or Firm* — Larson Newman, LLP

(57) ABSTRACT

An information handling system includes a device capable of sending and receiving security protocol and data model messages. A management controller with an authorization role as a designated leader is configured to verify authenticity of the device, discover authorization capabilities of the device, and set the authorization role of the device as a follower.

20 Claims, 5 Drawing Sheets

SYSTEM AND METHOD FOR AUTHORIZATION SCOPE EXTENSION FOR SECURITY PROTOCOL AND DATA MODEL CAPABLE DEVICES

FIELD OF THE DISCLOSURE

The present disclosure generally relates to information handling systems, and more particularly relates to authorization scope extension for security protocol and data model capable devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a device capable of sending and receiving security protocol and data model messages. A management controller with an authorization role as a designated leader is configured to verify authenticity of the device, discover authorization capabilities of the device, and set the authorization role of the device as a follower.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
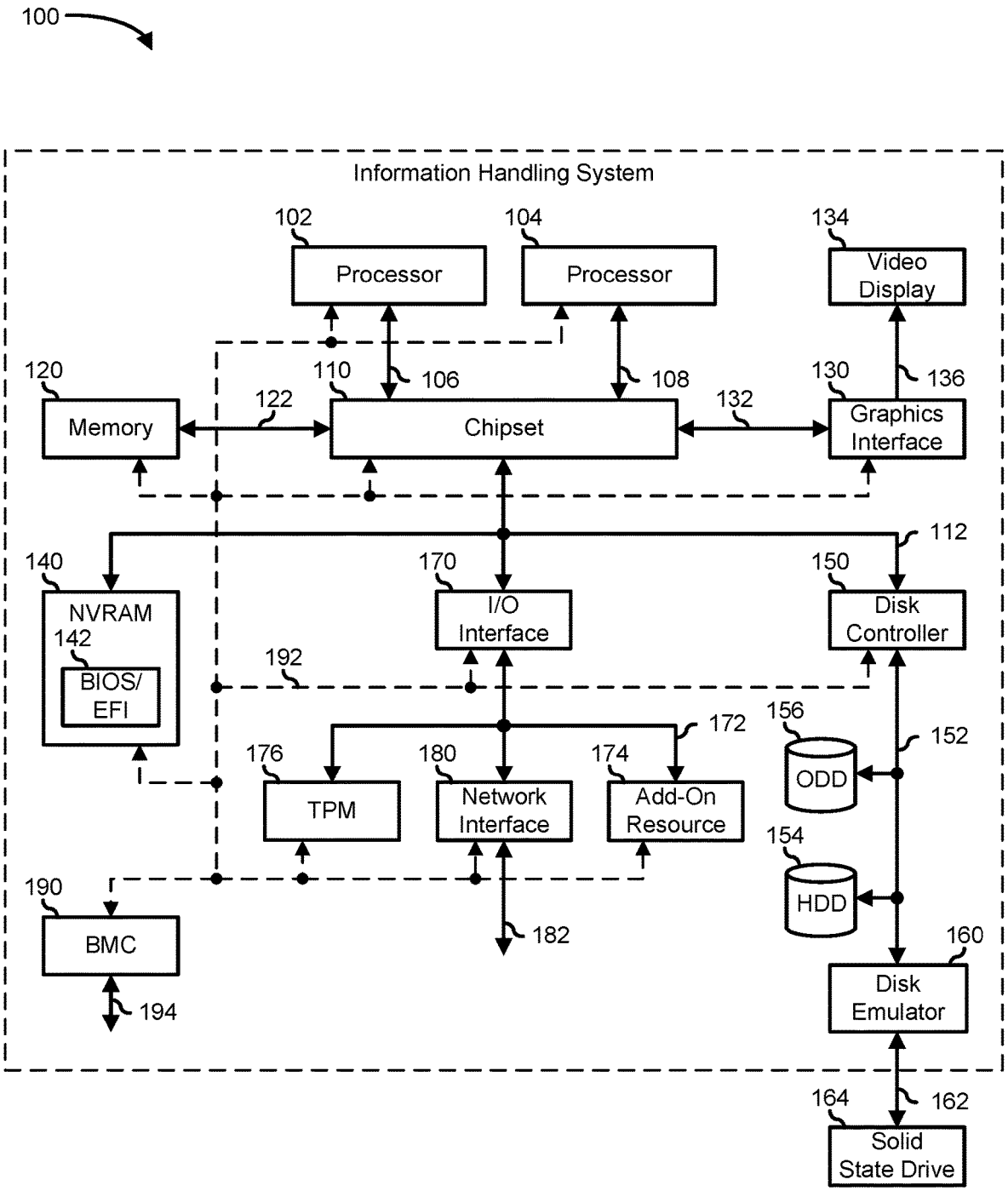
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The security protocol and data model (SPDM) architecture was prepared by the Platform Management Components Intercommunication (PMCI) working group of the DMTF to facilitate secure communication between components, also referred to herein as devices, in various platforms. Once the platform component identity is verified through the authentication process, such as by one-way or mutual authentication, the authorization process determines permissions of a requester. Generally, the requester may want to maintain exclusive access and control of certain functions of SPDM configuration data in a platform component such as a first managed device. However, it is possible for a second managed device to read and alter certain functions of the SPDM configuration data in a first managed device without the permission or knowledge of the management controller or service processor. Unauthorized transactions, such as setting a certificate or performing a firmware update, could lead to taking ownership of a device. This would pose a security issue as an unauthorized device can alter the behavior of another managed device. For example, the second managed device can alter a function of the SPDM configuration data in the first managed device. To address the above issues and other concerns, embodiments disclosed herein provide authorization mechanisms to restrict access and control of the SPDM data store of the managed devices.

Figure 2:
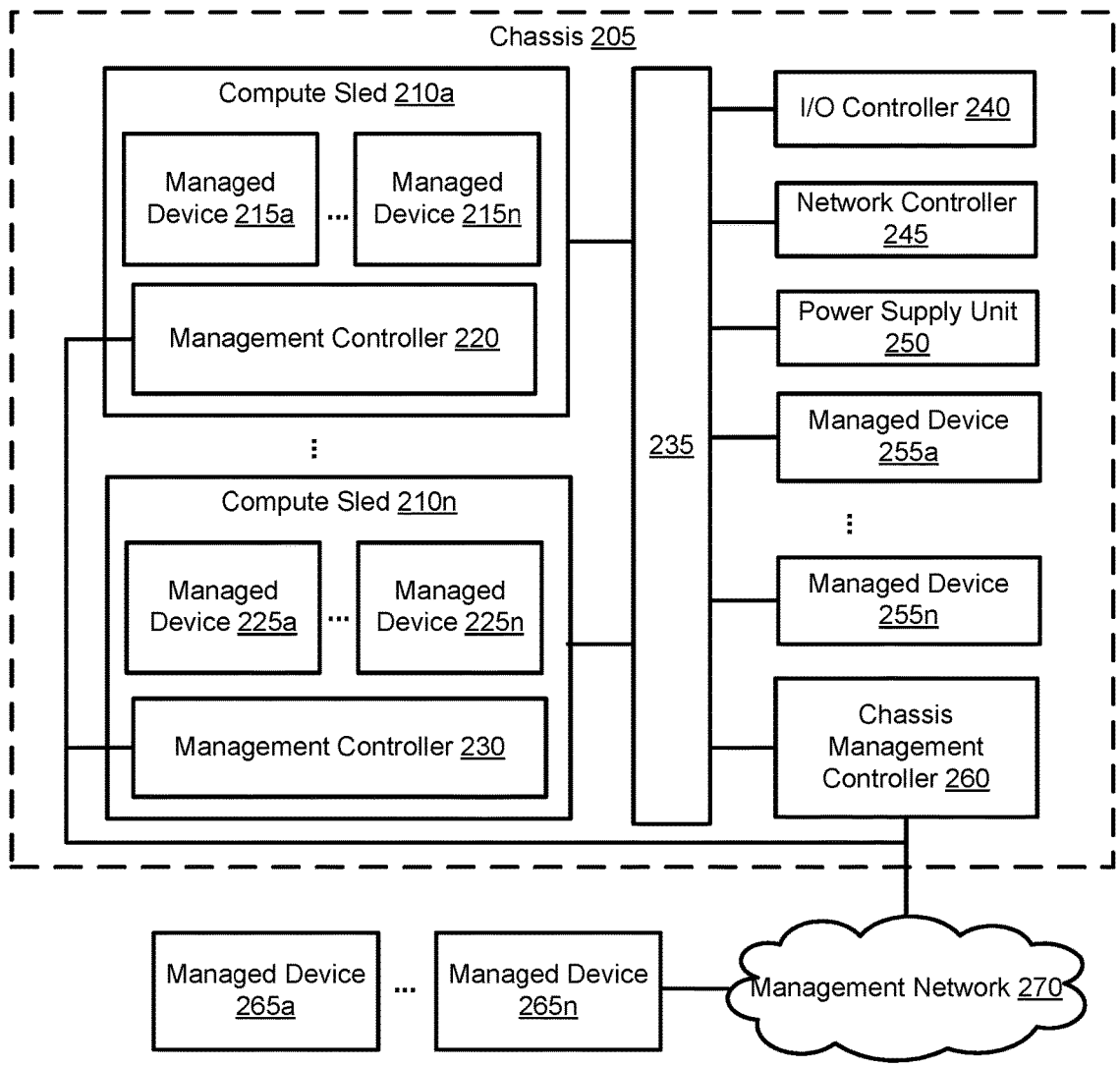
FIG. 2 is a block diagram illustrating an example of a system for designated leader election and authorization scope extension for security protocol and data model capable devices, according to an embodiment of the present disclosure.

FIG. 2 shows a system 200 which depicts an SPDM authorization scope extension protocol. System 200 includes one or more platform management subsystems where designated leader election and authorization scope extensions for SPDM capable devices may be implemented. In particular, the present system and method may restrict which device can read and alter SPDM data in the SPDM data store of another device. The SPDM data includes a certificate chain, firmware, etc. The platform management subsystem may be contained within servers, desktop systems, mobile systems, thin clients, blade systems, and other types of devices.

System 200 includes a chassis 205, a management network 270, and managed devices 265a-n. Chassis 205 may include one or more bays that each receives individual sleds such as compute sleds 210a-n and storage sleds. A sled may be referred to as a tray, blade, and/or node. The compute sleds and storage sleds are individually coupled to chassis 205 via connectors that physically and electrically couple an individual sled to a backplane 235. Backplane 235 may be a printed circuit board that includes electrical traces and connectors. Compute sled 210a includes managed devices 215a-n and management controller 220. Compute sled 210n7 includes managed devices 225a-n? and management controller 230. The management controllers and the managed devices support DMTF MCTP specifications as per transport layer requirements.

Each platform subsystem may include a management controller and at least one managed device. A managed device, such as one of managed devices 215a-n, managed devices 225a-n, managed devices 255a-n, managed devices 265a-n, an I/O controller 240, a network controller 245, a power supply unit 250, managed devices 255a-n, represents a device that includes one or more manageable functions or features that are accessible to be monitored, managed, and maintained by a management controller, such as management controller 220, management controller 230, and chassis management controller 260. For example, managed devices 215a-n may be managed by management controller 220 while managed devices 225a-n may be managed by management controller 230, and managed devices 265a-n may be managed by chassis management controller 260.

Chassis management controller 260 may manage managed devices 215a-n via management controller 220. Chassis management controller 260 may manage or control managed device 225a-n via management controller 230. Chassis management controller 260 may also control or manage I/O controller 240, network controller 245, power supply unit 250, and managed devices 255a-n. The managed device may include an out-of-band (OOB) management interface that permits the management controller or the chassis management controller to access one or more of the manageability functions and features of the managed device. The managed device may be a platform device or platform component such as a PCIe device, cooling fan, storage device, I$^2$C/SMBus device, MCTP device, platform level data model (PLDM) device, or the like. In addition, the managed device may be an SPDM capable device. The SPDM capable device is a device configured to send and receive an SPDM message.

The system and method in the present disclosure includes an algorithm for electing a "designated leader" from a group or set of devices, reducing the complexity of device security decision making. The management controller or chassis management controller, which typically is a requester in the present disclosure, may be elected as the designated leader in the group or set of devices. For example, management controller 220 may be elected as a designated leader in a set of devices that includes management controller 220, managed devices 215a-n. The designated leader may coordinate the activities, such as security activities, of the managed devices. The other members of the group or set of devices are designated as followers and adhere to the security principles set by the designated leader. The present disclosure proposes extension commands to the VENDOR_DEFINED_REQUEST and VENDOR_DEFINED_RESPONSE for setting the designated leader and follower on each of the SPDM capable devices as shown in Table 1 and Table 2.

Table 1 shown below illustrates a VENDOR_DEFINED_REQUEST request message format. The VENDOR_DEFINED_REQUEST request message is extended to include additional parameters: "AuthorizationCapabilities" and "AuthorizationScopeExt" which adds authorization capabilities and scope for the requester. The parameter AuthorizationCapabilities describes the capability of the requester to determine whether an authenticated managed device is authorized to perform an authorization function or operation. The parameter AuthorizationScopeExt describes the capability of the requester to determine the kind of authorization function or operation that the authenticated managed device is authorized to perform. The authorization scope defines the set authorization functions or operations are allowed or denied based on the authorization role, such as designated leader or follower, as shown in table 3.

TABLE 1

VENDOR_DEFINED_REQUEST request message format

| Offset | Field | Size | Bit: Value |
|---|---|---|---|
| 0 | SPDMVersion | 1 | V1.1 = 0x11 |
| 1 | RequestResponseCode | 1 | 0xFE = VENDOR_DEFINED_REQUEST |
| 2 | Param1 | 1 | Reserved |
| 3 | Param2 | 1 | Reserved |
| 4 | StandardID | 2 | Shall indicate the registry or standards body by using one of the values in the identifier (ID) column in the registry or standards body ID table |
| 6 | AuthorizationCapabilities | 1 | Authorization capabilities let the requester determine if the device is capable of authorization scope extension Bit 0-0: Not Supported or 1: Enabled Bit 1-7: Future use |
| 7 | AuthorizationScopeExt | 2 | Authorization scope extension lets the requester specify exactly what type of authorization(s) allowed/denied at runtime. |

Table 2 shown below illustrates a VENDOR_DEFINED_RESPONSE response message format. The VENDOR_DEFINED_RESPONSE response message is extended to include additional parameters: "Authorization- Capabilities" and "AuthorizationScopeExt" which adds authorization capabilities and scope for the requester. The parameter AuthorizationCapabilities describes whether an authenticated managed device is authorized to perform an authorization function or operation. The parameter AuthorizationScopeExt describes the authorization function or operation that the authenticated managed device is authorized to perform. The authorization scope defines the set authorization functions or operations are allowed or denied based on the authorization role, such as designated leader or follower, as shown in table 3.

TABLE 2

VENDOR_DEFINED_RESPONSE response message format

| Offset | Field | Size | Bit: Value |
|---|---|---|---|
| 0 | SPDMVersion | 1 | V1.1 = 0x11 |
| 1 | RequestResponseCode | 1 | 0xFE = VENDOR_DEFINED_RESPONSE |
| 2 | Param1 | 1 | Reserved |
| 3 | Param2 | 1 | Reserved |
| 4 | StandardID | 2 | Shall indicate the registry or standards body by using one of the values in the ID column in the registry or standards body ID table |
| 6 | AuthorizationCapabilities | 1 | Authorization capabilities let the requester determine if the device is capable of authorization scope extension Bit 0-0: Not Supported or 1: Enabled Bit 1-7: Future use |
| 7 | AuthorizationScopeExt | 2 | Authorization scope extension lets the requester specify exactly what type of authorization(s) allowed/denied at runtime. |

TABLE 3

Authorization Scope Attribute Definition

| Offset | Field | Size | Bit: Value |
|---|---|---|---|
| 1 | DeviceOperatingRole | 1 | Bit 0: None, Bit 1: Designated Leader, Bit 2: Follower, Bit 3-7: Reserved |
| 2 | Scope | 1 | Bit 0: Status (0: Not Initialized, 1: Access Violation) Bit 1: Read/write access to private and public information (0: Read, 1: Read/write) Bit 2: Read/write access public information (0: Read, 1: Read/write) Bit 3: Allow update firmware (0: Disabled, 1: Enabled) Bit 4-7: Future use |

Figure 3:
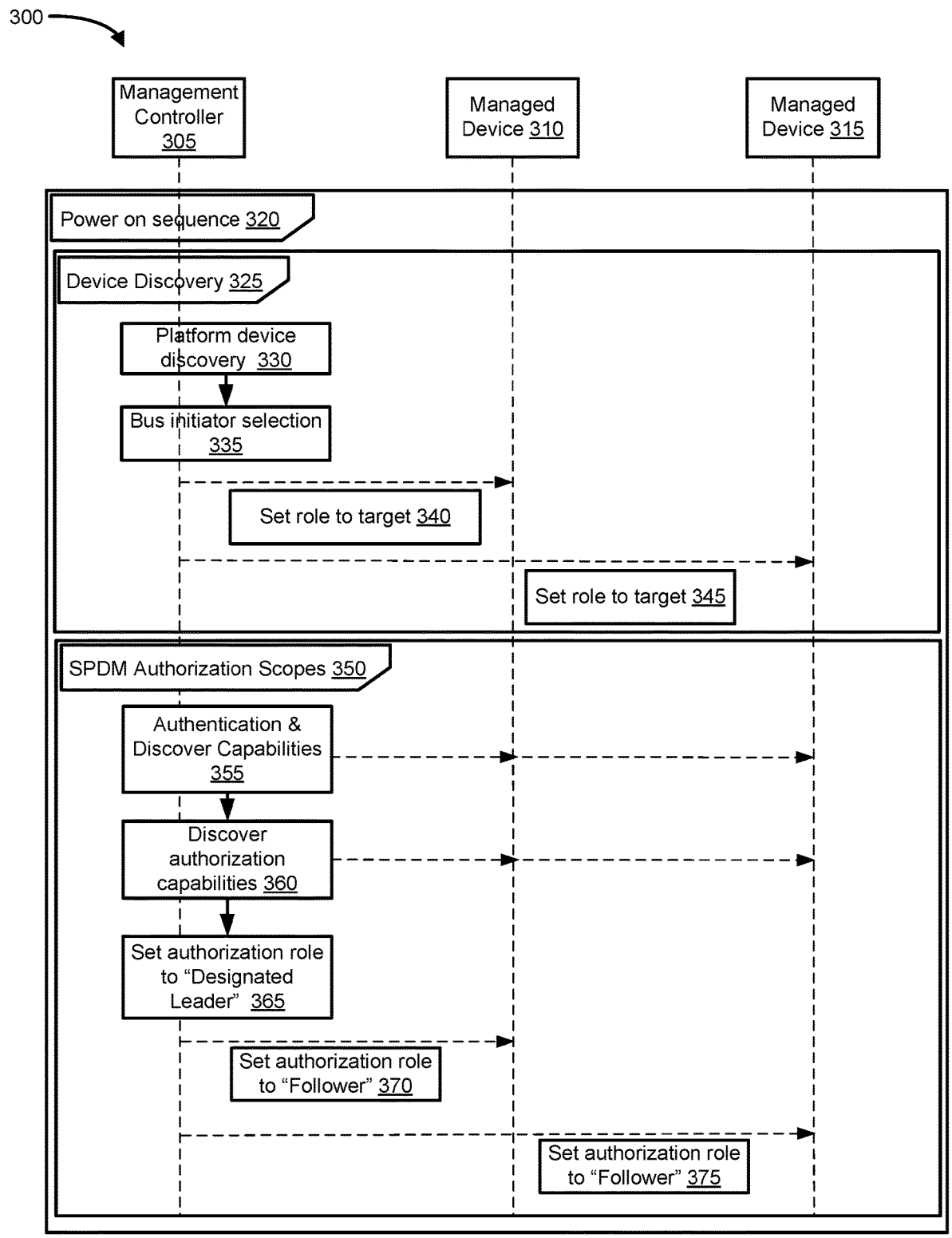
FIG. 3 is a flowchart illustrating an example of a messaging protocol flow for designated leader election and authorization scope extension for security protocol and data model capable devices, according to an embodiment of the present disclosure.

FIG. 3 shows a flowchart of a messaging protocol flow 300 for designated leader election and authorization scope extension for SPDM capable devices. The flowchart includes a management controller 305, a managed device 310, and a managed device 315. The flowchart also shows the aforementioned communicating with each other via SPDM messages. Management controller 305 may be a requester while managed device 310 and managed device 315 may be responders. One of skill in the art will appreciate that this flowchart explains a typical example, which can be extended to advanced applications or services in practice.

The requester is the original transmitter, or source, of an SPDM request message. The SPDM request message is a message that is sent to an endpoint, also referred to as a managed device or responder, to request an SPDM operation. A corresponding SPDM response message acknowledges receipt of the SPDM request message from the endpoint. A responder is the receiver, or destination, of an SPDM request message. The responder is also the original transmitter, or source, of an SPDM response message. The SPDM response message is a message that is sent in response to an SPDM request message. This message includes a response code field that indicates whether the request completed normally or not.

Messaging protocol flow 300 includes block 320 where a power sequence operation may be performed by an information handling system, such as when the information handling system is powered on. The power sequence operation may include a transport layer initialization and discovery by bus enumeration, bus address assignment, capability discovery, endpoint assignment, etc. Block 320 includes block 325 and block 350. Block 325 includes block 330, block 335, block 340 and block 345.

Block 325 typically starts at block 330 where the method performs a platform device discovery. For example, management controller 305 may transmit an endpoint discovery broadcast request message to a set of platform devices. One or more of the devices may send an endpoint discovery response message. The method proceeds to block 335 where a bus initiator selection is performed. A device, which can initiate a bus operation, such as management controller 305, is usually termed as a bus initiator. A device responding to a bus operation, such as managed device 310 and managed device 315, acts as a bus target. Typically, when the bus initiator initiates an operation, the bus initiator requests ownership of the bus. By default, the bus initiator takes initiator ownership of the group or set of managed devices. As such, in this example, management controller 305 is the bus initiator while managed device 310 and managed device 315 are bus targets. At block 340, management controller 305 transmits a message to managed device 310 designating it as a target. At block 345, management controller 305 transmits a message to managed device 315 designating it as a target.

After the device discovery at block 325, the method performs block 350 where the SPDM authorization scopes are determined. Block 350 typically starts at block 355 where management controller 305 initiates SPDM discovery of endpoint security version and capabilities of managed device 310 and managed device 315. Management controller 305 verifies the authenticity of managed device 310 and managed device 315. Managed device 310 and managed device 315 may also verify the authenticity of management controller 304. Several mechanisms may be used to verify the identity of management controller 305, managed device 310, and managed device 315, such as via X.509 certificate(s). After one-way or mutual authentication, management controller 305 may establish a trust store database in its cache.

At block 360, management controller 305 discovers the authorization capabilities of the managed devices, such as managed device 310 and managed device 315. Management controller 305 becomes the default SPDM designated leader and the other devices are designated as "followers." The designated leader maintains a list of the followers. At block 365, the authorization role of management controller 305 is set as the designated leader. At block 370, management controller 305 sets the authorization role of managed device 310 as a follower. At block 370, management controller 305 sets the authorization role of managed device 315 as a follower. For example, management controller 305 may send a VENDOR_DEFINED_REQUEST request message to managed device 310 and managed device 315 to set the follower authorization role. The VENDOR_DEFINED_REQUEST request message may also be used to set the authorization role of the management controller 305 as the designated leader.

Figure 4:
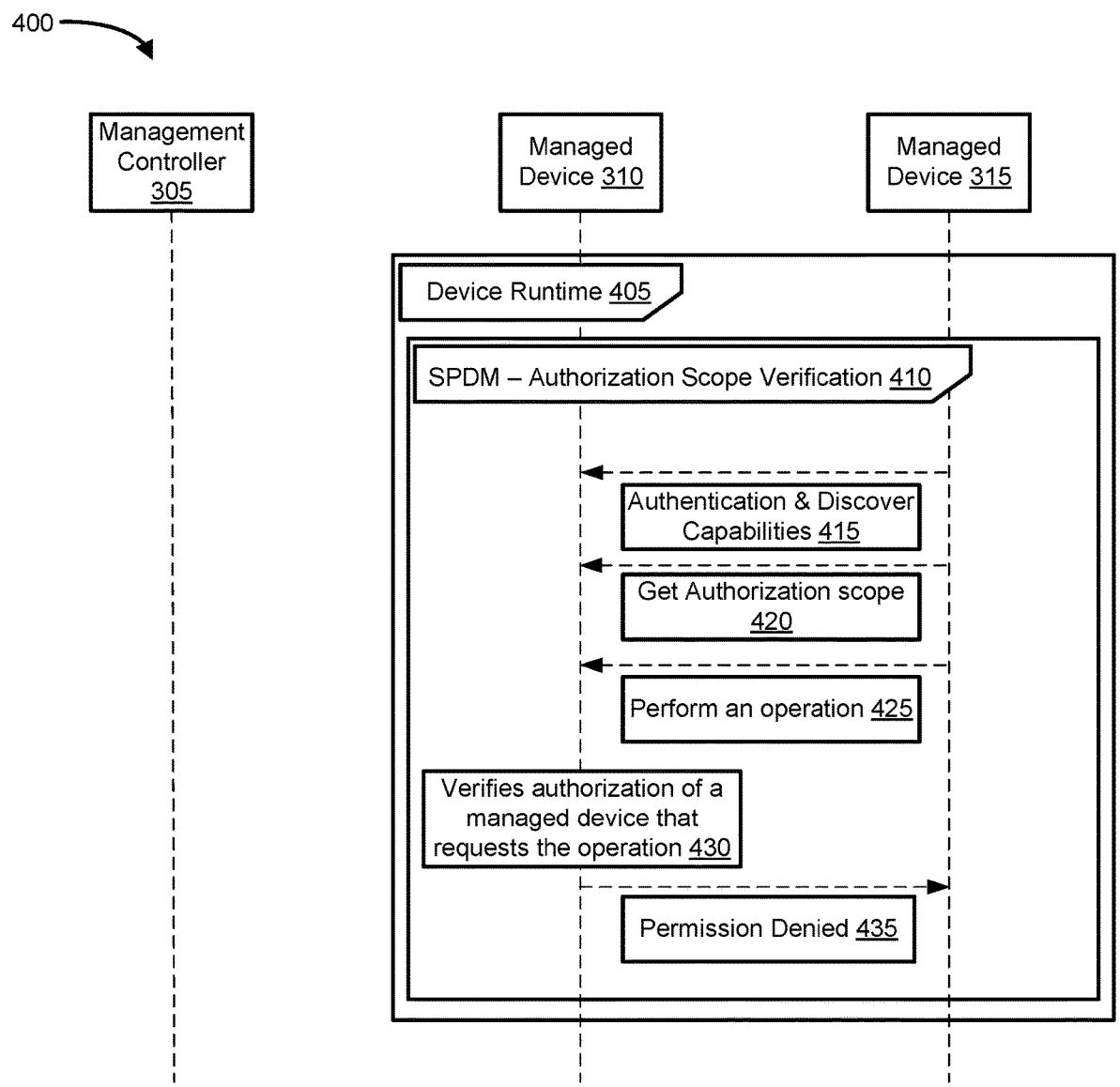
FIG. 4 is a flowchart illustrating an example of a runtime messaging protocol flow with authorization scope extensions for security protocol and data model capable devices, according to an embodiment of the present disclosure.

FIG. 4 shows a flowchart of a messaging protocol flow 400 which may occur after messaging protocol flow 300. Messaging protocol flow 400 includes a block 405 which is a runtime sequence scenario. Block 405 includes a block 410 where SPDM authorization scope verification is performed. Block 410 typically starts at block 415, where managed device 315 initiates an SPDM authentication message with managed device 310. At block 420, managed device 315 interrogates the authorization capabilities of managed device 310. For example, managed device 315 sends a VENDOR_DEFINED_REQUEST message to managed device 310. At block 425, managed device 315 performs an operation which may be a security-sensitive operation such as setting a certificate or performing a firmware update. After receiving the request, managed device 310 determines the authorization of the device that requested the operation at block 430. For example, managed device 310 determines the authorization role of managed device 315 based on the deviceOperatingRole attribute. The authorization role of managed device 315 could be either a designated leader or a follower. Because managed device 315 is a follower then the permission to perform the operation requested is denied and responds with an error "Access Violation" or "Permission Denied" in block 435. If the device requesting to perform the security-sensitive operation is a follower, any change to the sensitive information is not permitted. If the device requesting to perform the security-sensitive operation is a designated leader, then its authorization scope is determined.

Figure 5:
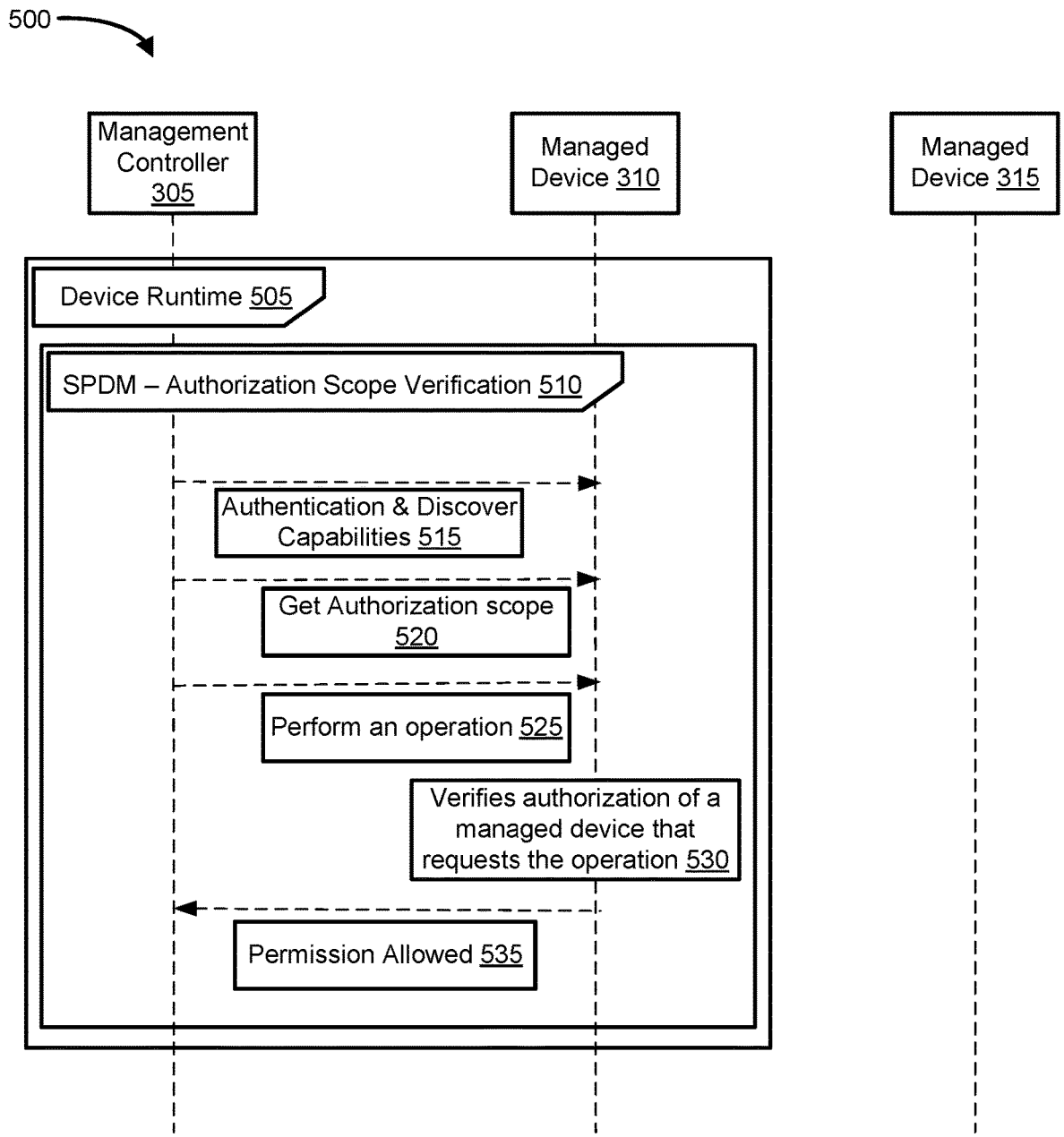
FIG. 5 is a flowchart illustrating an example of a runtime messaging protocol flow with authorization scope extension for security protocol and data model capable devices, according to an embodiment of the present disclosure.

FIG. 5 shows a flowchart of a messaging protocol flow 500 which may occur after messaging protocol flow 300. Messaging protocol flow 500 includes block 505 which is a runtime sequence scenario. Block 505 includes block 510 where SPDM authorization scope verification is performed. Block 510 typically starts at block 515, where management controller 305 initiates SPDM authentication with managed device 310. At block 520, management controller 305 interrogates the authorization capabilities of managed device 310. At block 525, management controller 305 performs an operation that may be a security-sensitive operation such as setting a certificate or performing a firmware update. After receiving the request, managed device 310 determines the authorization of the device that requested the operation at block 530. For example, managed device 310 determines the authorization role of management controller 305 which may be based on a deviceOperatingRole attribute. The authorization role of management controller 305 could be either a designated leader or a follower. Because management controller 305 is a designated leader then permission to perform the operation is allowed and responds accordingly, such as with "Access Authorized" or "Permission Allowed" in block 535.

Although FIG. 3, FIG. 4, and FIG. 5 show example blocks of messaging protocol flow 300, messaging protocol flow 400, and messaging protocol flow 500 in some implementation, messaging protocol flow 300, messaging protocol flow 400, and messaging protocol flow 500 may include additional blocks, fewer blocks, different blocks, or differently arranged blocks than those depicted in FIG. 3, FIG. 4, and FIG. 5. Additionally, or alternatively, two or more of the blocks of messaging protocol flow 300, messaging protocol flow 400, and messaging protocol flow 500 may be performed in parallel. For example, block 370 and block 375 of messaging protocol flow 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
   a device capable of sending and receiving security protocol and data model (SPDM) messages using an SPDM protocol, wherein the device is managed by a management controller; and
   the management controller in communication with the device and with an authorization role as a designated leader, the management controller configured to:
   verify authenticity of the device;
   subsequent to the verification of the authenticity of the device, discover authorization capabilities of the device;
   set the authorization role of the device as a follower, including defining an authorization scope of the device based on the authorization role; and
   deny a security operation if the security operation is requested by the device with the authorization role as the follower.

2. The information handling system of claim 1, wherein the device is one of a Peripheral Component Interconnect-Express (PCIe) device, an inter-integrated circuit (I²C), a management component transport protocol (MCTP) device, or a platform level data model (PLDM) device.

3. The information handling system of claim 1, wherein the authorization scope includes whether the management controller or the device is authorized to read/write to private information.

4. The information handling system of claim 1, wherein the authorization scope includes whether the management controller or the device is authorized to read/write to public information.

5. The information handling system of claim 1, wherein the authorization scope includes whether the management controller or the device is authorized to update firmware.

6. The information handling system of claim 1, wherein the management controller and the device are included in a platform management subsystem of the information handling system.

7. The information handling system of claim 1, wherein the follower adheres to security principles set by the management controller.

8. The information handling system of claim 1, wherein the management controller maintains a list of devices that are followers of the management controller.

9. The information handling system of claim 1, wherein the authorization role defines a set of allow/deny operations based on the authorization role.

10. The information handling system of claim 1, wherein the device is further configured to determine the authorization scope of a requester subsequent to receipt of a request to perform an operation from the requester.

11. The information handling system of claim 10, wherein the requester is one of the management controller or another device.

12. The information handling system of claim 10, wherein the device is further configured to deny the request upon the determination that the authorization scope of the requester disallows the operation.

13. The information handling system of claim 10, wherein the device is further configured to allow the operation upon the determination that the authorization scope of the requester allows the operation.

14. A method comprising:
    verifying, by a management controller, authenticity of a device capable of sending and receiving security protocol and data model (SPDM) messages using an SPDM protocol, wherein the device is configured to communicate with the management controller, and wherein the device is managed by the management controller;
    subsequent to the verifying of the authenticity of the device, discovering authorization capabilities of the device;
    setting an authorization role of the device as a follower, including defining an authorization scope of the device based on the authorization role; and
    denying a security operation if the security operation is requested by the device with the authorization role of the follower.

15. The method of claim 14, wherein the authorization role defines a set of allow/deny operations based on the authorization role.

16. The method of claim 14, wherein the device is further configured to determine the authorization scope of a requester subsequent to receipt of an operation from the requester.

17. The method of claim 16, wherein the device is further configured to deny the operation upon the determination that the authorization scope of the requester disallows the operation.

18. A non-transitory computer-readable medium including code that when executed performs a method, the method comprising:
    verifying authenticity of a device capable of sending and receiving security protocol and data model (SPDM) messages using an SPDM protocol, wherein the device is configured to communicate with a management controller, and wherein the device is managed by the management controller;

subsequent to the verifying of the authenticity of the device, discovering authorization capabilities of the device and setting an authorization role of the device as a follower, including defining an authorization scope of the device based on the authorization role; and denying a security operation if the security operation is requested by the device with the authorization role of the follower.

19. The non-transitory computer-readable medium of claim 18, wherein the device is one of a Peripheral Component Interconnect-Express device, an inter-integrated circuit, a management component transport protocol device, or a platform level data model device.

20. The non-transitory computer-readable medium of claim 18, wherein the authorization role defines a set of allow/deny operations based on the authorization role.

* * * * *